US011968487B2

(12) United States Patent
LoPresti et al.

(10) Patent No.: US 11,968,487 B2
(45) Date of Patent: *Apr. 23, 2024

(54) ADAPTERS FOR MICROPHONES AND COMBINATIONS THEREOF

(71) Applicant: Knowles Electronics, LLC, Itasca, IL (US)

(72) Inventors: Janice LoPresti, Itasca, IL (US); Steve Kearey, Carpentersville, IL (US); Usha Murthy, Lisle, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,148

(22) Filed: Apr. 15, 2023

(65) Prior Publication Data

US 2023/0254619 A1 Aug. 10, 2023

Related U.S. Application Data

(60) Continuation of application No. 17/571,421, filed on Jan. 7, 2022, now Pat. No. 11,659,310, which is a (Continued)

(51) Int. Cl.
*H04R 1/04* (2006.01)
*H04R 19/04* (2006.01)

(52) U.S. Cl.
CPC ............... *H04R 1/04* (2013.01); *H04R 19/04* (2013.01); *H04R 2201/003* (2013.01)

(58) Field of Classification Search
CPC .... H04R 1/04; H04R 19/04; H04R 2201/003; H04R 1/2807; H04R 1/342; H04R 19/005;
(Continued)

(56) References Cited

U.S. PATENT DOCUMENTS 11,259,104 B2 * 2/2022 LoPresti .................. H04R 1/04
11,659,310 B2 * 5/2023 LoPresti .................. H04R 1/04 381/355
(Continued)

FOREIGN PATENT DOCUMENTS

WO WO-2011145790 A1 * 11/2011 ........... H04R 1/2807

*Primary Examiner* — Angelica M McKinney
(74) *Attorney, Agent, or Firm* — Loppnow & Chapa; Matthew C. Loppnow

(57) ABSTRACT

A microphone assembly can include a form-factor adapter housing including an interface opening and an external acoustic port, and an internal microphone assembly disposed at least partially within the adapter housing. The internal microphone assembly can include an internal housing having an internal acoustic port and electrical interface contacts, a microelectromechanical systems (MEMS) motor disposed in the internal housing, and an integrated circuit disposed in the internal housing, the integrated circuit electrically coupled to the MEMS motor and to the electrical interface contacts. The assembly can include an adapter interface located at the interface opening and comprising external host device interface contacts electrically coupled to the electrical interface contacts, the external host device interface contacts exposed to an exterior of the microphone assembly. The internal acoustic port can be acoustically coupled to the external acoustic port.

19 Claims, 7 Drawing Sheets

Related U.S. Application Data division of application No. 16/909,818, filed on Jun. 23, 2020, now Pat. No. 11,259,104.

(58) Field of Classification Search

CPC ........ H04R 1/083; H04R 17/02; H04R 17/10; H04R 19/016; H04R 2201/02; H04R 2217/00; H04R 7/04; H04R 7/18; H04R 7/20; H04R 2207/021; H04R 1/086; H04R 2499/11; B81B 3/007; B81B 2201/0257; B81B 2203/0127; B81B 3/0072; B81B 7/0035; B81B 7/0061; B81B 7/0032; B81B 3/0021; H01L 29/84

See application file for complete search history.

(56) References Cited

U.S. PATENT DOCUMENTS

| | | | | |
|---|---|---|---|---|
| 2014/0233756 | A1* | 8/2014 | Inoda | H04R 1/38<br>381/91 |
| 2015/0001648 | A1* | 1/2015 | Lee | B81B 7/0032<br>257/416 |
| 2015/0181349 | A1* | 6/2015 | Patterson, Jr. | H04R 19/016<br>381/398 |
| 2018/0213312 | A1* | 7/2018 | Hsiao | H04R 1/04 |

* cited by examiner

ADAPTERS FOR MICROPHONES AND COMBINATIONS THEREOF

BACKGROUND

1. Field

The present disclosure relates generally to microphones and more particularly to adapter housings for microphones and combinations thereof.

2. Introduction

Consumer electronic devices like mobile phones, personal computers, smart speakers, hearing aids, true wireless stereo (TWS) earphones among other host device applications commonly incorporate one or more small microphones. Advancements in micro and nanofabrication technologies have led to the development of microphones having progressively smaller size and different form-factors. For example, the once predominate use of electret microphones in these and other applications is being supplanted by capacitive microelectromechanical systems (MEMS) microphones for their low cost, small size and high sensitivity.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore considered to limit its scope. The drawings may have been simplified for clarity and are not necessarily drawn to scale.

DETAILED DESCRIPTION

Figure 1:
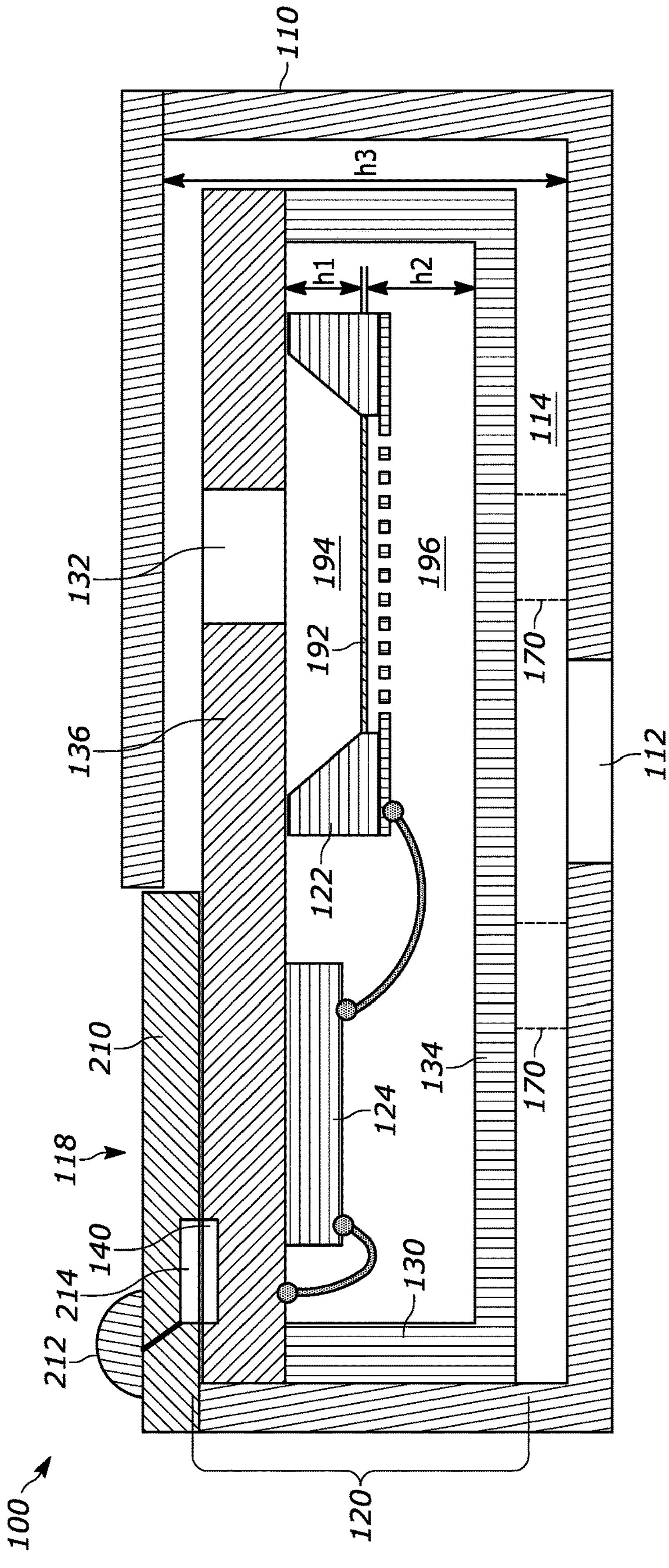
FIG. 1 is an example side cross-section view of a microphone according to a possible embodiment.

Embodiments can provide a microphone including an adapter housing. The adapter housing can include an opening and an outer acoustic port. The microphone can include an internal microphone assembly disposed at least partially within the adapter housing. The internal microphone assembly can include an internal housing having an internal acoustic port. The internal microphone assembly can include a plurality of contacts disposed on the internal housing. The contacts can be accessible through the opening of the adapter housing. An interior of the internal housing can be acoustically coupled to the outer acoustic port via the internal acoustic port.

Referring to different possible embodiments shown in FIGS. 1, 2, and 4-8, a microphone 100 can include an adapter housing 110 and an internal microphone assembly 120. The adapter housing 110 can be a can, which can be made of metal, metal-coated plastic, FR4, plastic and/or other materials. The adapter housing 110 can also be a can and a base, can be two cans, and/or can be any other arrangement of housing elements. The base can be a Printed Circuit Board (PCB), a substrate, or any other element that can provide a base. The internal microphone assembly 120 can be a MEMS microphone assembly, an electret microphone assembly, a piezoelectric microphone, among other known and future microphone assemblies.

Referring to different possible embodiments shown in FIGS. 1, 2, and 4-7, the microphone 100 can include an internal housing 130. Referring to different possible embodiments shown in FIGS. 1, 2, and 5-7, the microphone 100 can include an outer acoustic port 112. Referring to different possible embodiments shown in FIGS. 1, 2, 5, and 6, the adapter housing 110 can include an opening 118.

Figure 7:
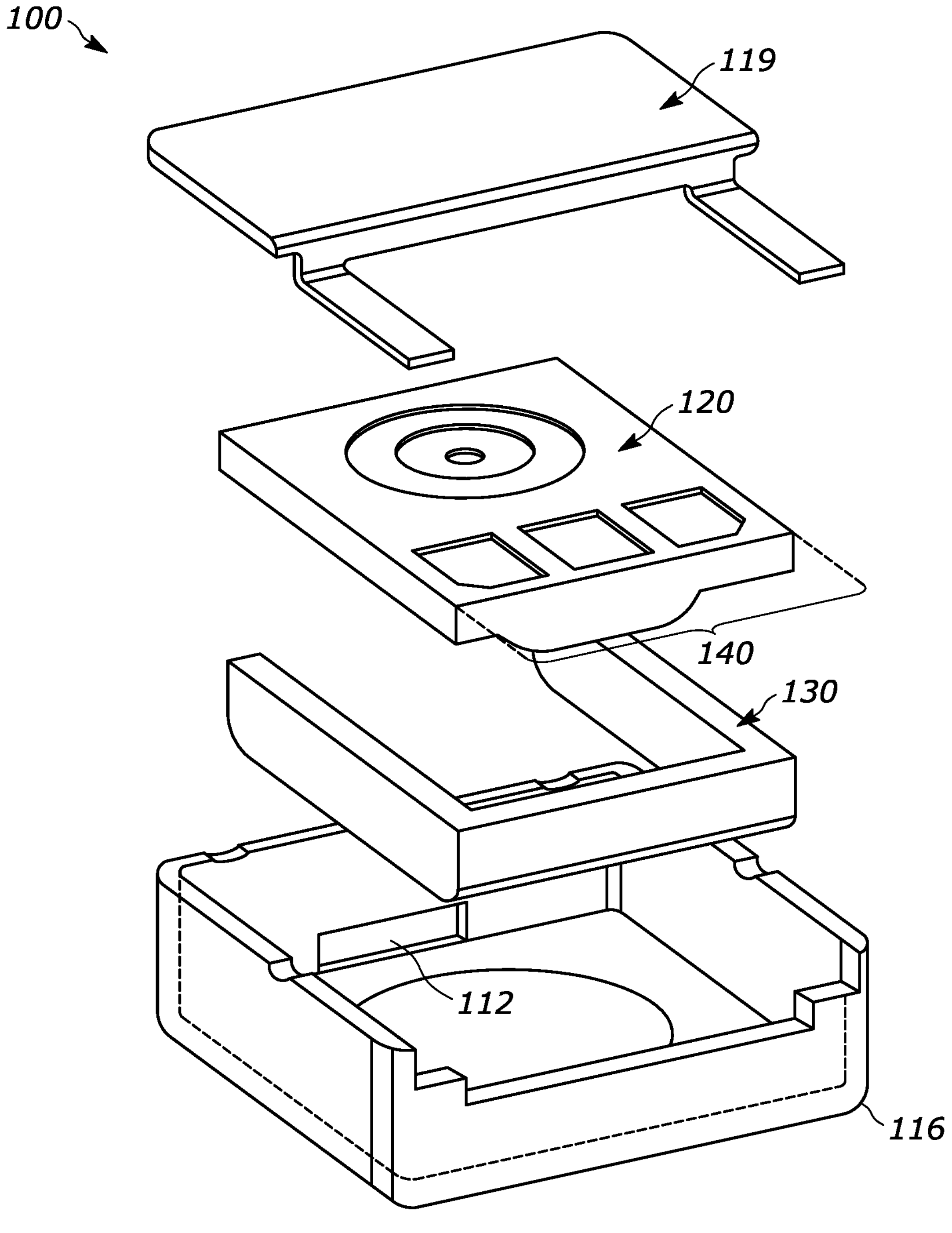
FIG. 7 is an example exploded view of a microphone according to a possible embodiment.

The internal microphone assembly 120 can be disposed at least partially within the adapter housing 110. The internal housing 130 can have an internal acoustic port 132. The internal microphone assembly 120 can also include a plurality of contacts 140 disposed on the internal housing 130. FIG. 7 shows individual contacts 140 on the internal microphone assembly 120 wherein the contacts 140 are accessible and exposed through the opening 118 of the adapter housing 110 (without use of PCB 210 shown in FIG. 1 or the flex shown in FIG. 2). An interior of the internal housing 130 can be acoustically coupled to the outer acoustic port 112 via the internal acoustic port 132.

According to a possible embodiment, the interior of the internal housing 130 can be acoustically coupled to the outer acoustic port 112 via the internal acoustic port 132 and via an acoustic channel 114, such as an acoustic path, between the internal housing 130 and the adapter housing 110. The acoustic channel 114 can also be located between the internal housing 130 and the adapter housing 110 on sides not shown, such as by completely surrounding the internal housing 130 aside from support structures between the housings 110 and 130 or by partially surrounding the internal housing 130.

According to a possible embodiment, the internal microphone assembly 120 can include a MEMS motor 122 and an integrated circuit 124 disposed within the internal housing 130. Alternatively, the motor can be an electret motor, piezoelectric motor or some other known or future transduction element. The integrated circuit 124 can be electrically coupled to the motor and to the contacts 140 of the internal microphone assembly. In audio applications, the motor can also be acoustically coupled to the outer acoustic port 112 via the internal acoustic port 132. The motor in combination with the integrated circuit 124 disposed in the internal housing 130 constitute the internal microphone assembly 120.

Figure 2:
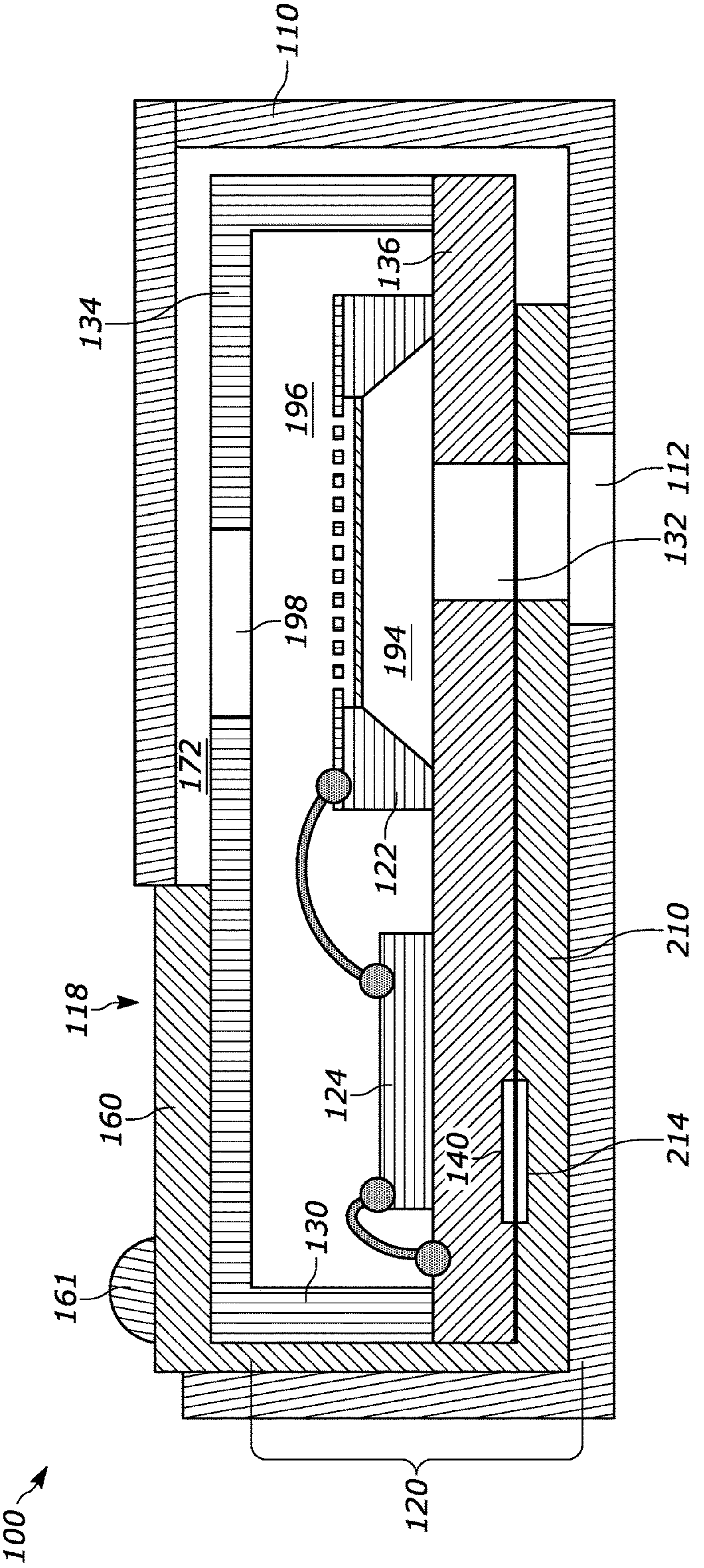
FIG. 2 is an example side cross-section view of a microphone according to a possible embodiment.
Figure 3:
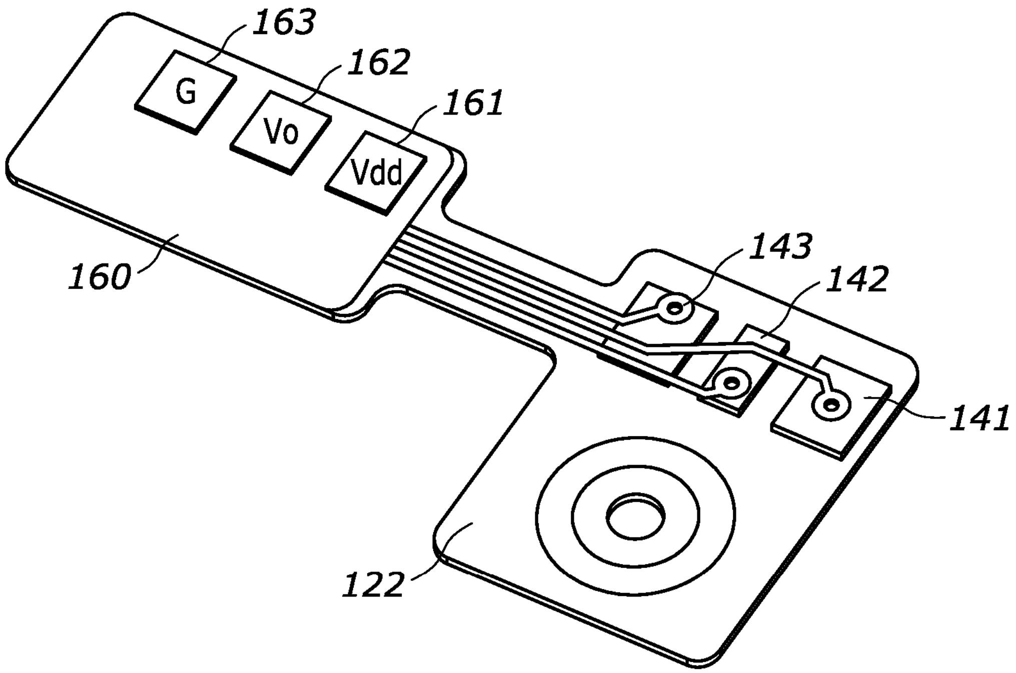
FIG. 3 is an example illustration of a MEMS motor and a flex according to a possible embodiment.
Figure 4:
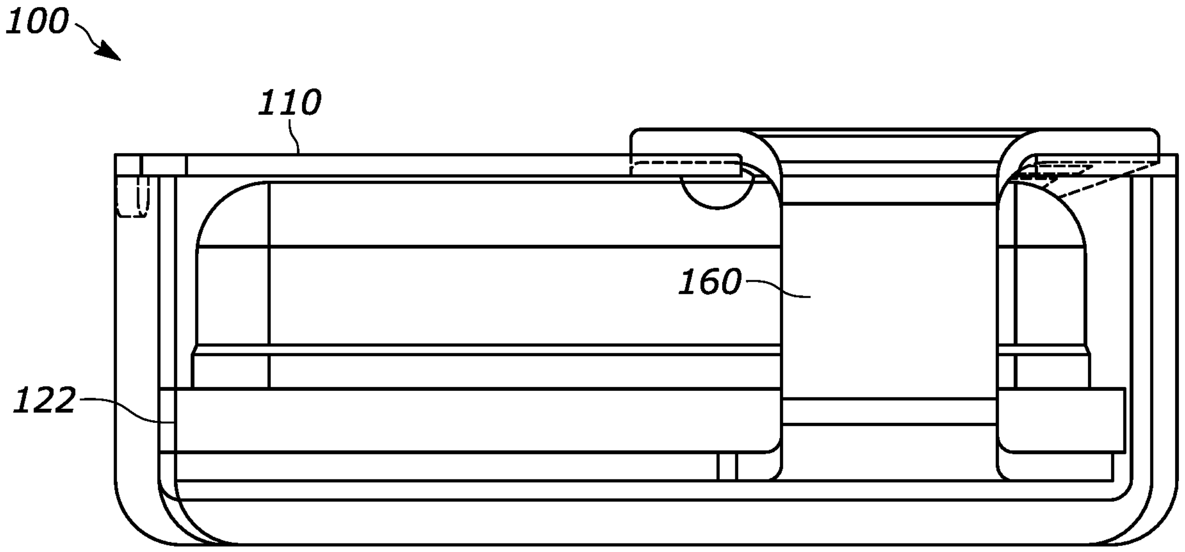
FIG. 4 is an example side view of a microphone according to a possible embodiment.
Figure 8:
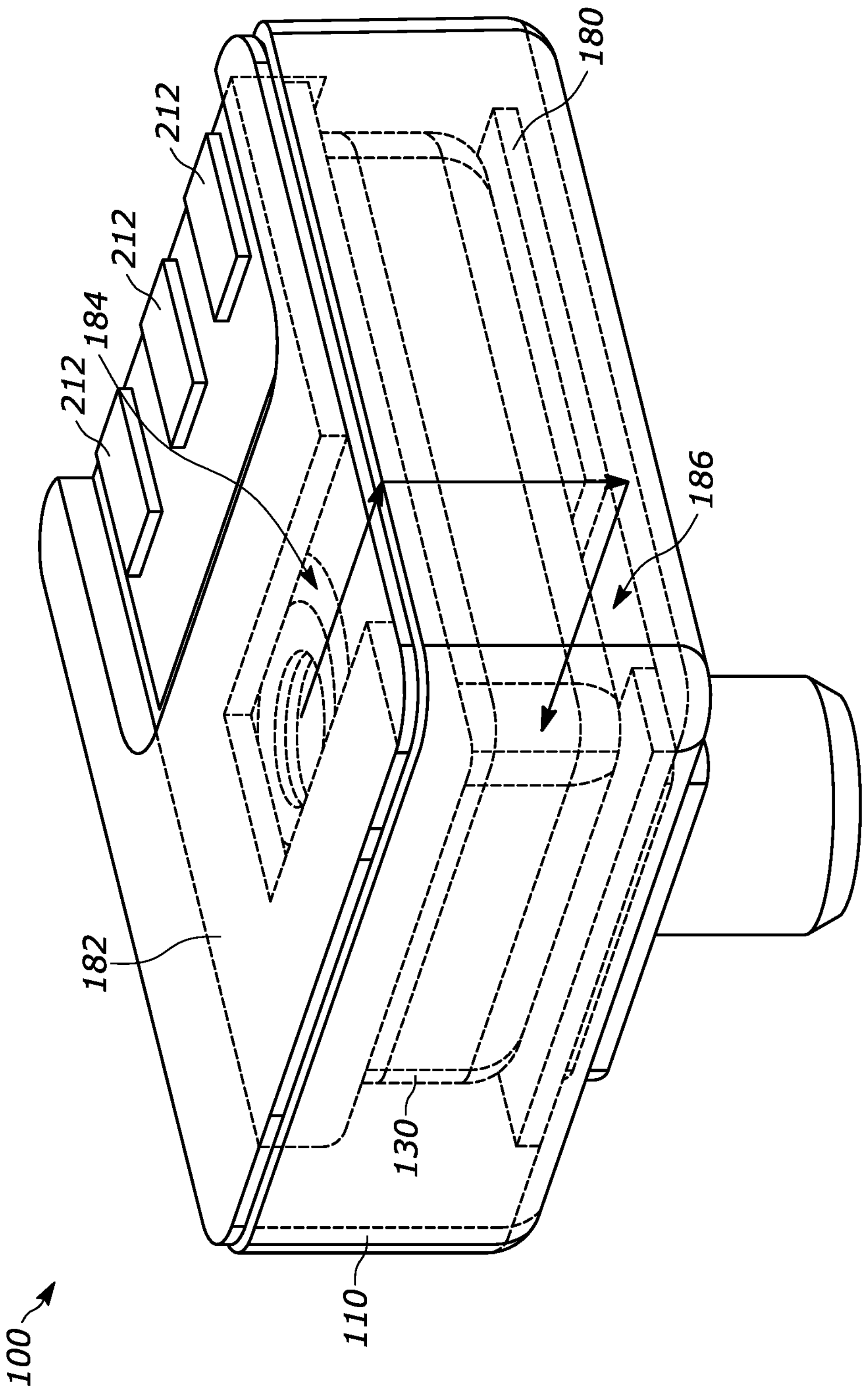
FIG. 8 is an example isometric view of a microphone according to a possible embodiment.

Referring to FIGS. 1 and 8 according to possible embodiments, the microphone 100 can be in combination with an interface adapter 210 having a plurality of electrical traces (not shown) that interconnect contacts 140 of the internal microphone assembly with corresponding host device interface contacts 212 on the interface adapter 210. For example, the contacts can be coupled to pads 214 on the interface adapter 210, which can be electrically connected to the interface contacts 212, such as by being joined by a layer of solder. The interface adapter 210 can be a PCB or a flex circuit. Referring to FIGS. 2, 3 and 4, the microphone 100 can be in combination with an interface adapter configured as a flex circuit 160 having electrical traces 161, 162, and 163 interconnecting contacts 140 of the internal microphone assembly 120 (see FIG. 2) and corresponding contacts 141, 142, 143 on the flex circuit 160. In FIGS. 2 and 4, the flex circuit 160 has a first end portion 122 connected to contacts 140 of the internal microphone assembly, an intermediate portion that wraps around the internal microphone assembly, and a second end portion with host interface contacts (e.g., 161, 162 and 163 in FIG. 3). The adapter interface can also be used to change the arrangement or order of the contacts 140 on the internal microphone assembly as they appear on at the host device interface contacts of the flex or PCB. For example, GRND, PWR, DATA contacts on the internal microphone can be changed to appear as GRND, DATA, PWR on host device interface of the PCB or flex circuit.

The internal housing 130 can include a cover 134 mounted on a base 136. The contacts 140 can be surface-mount contacts disposed on the base 136 and can comprise a negative contact 142 located between an output signal contact 141 and a positive contact 143. The flex circuit 160 can have a plurality of host interface contacts 161-163 each electrically coupled to a corresponding contact of the internal housing 130 by a corresponding electrical trace 164. The plurality of host interface contacts 161-163 of the flex circuit 160 can include a host output signal contact 162 located between a host positive contact 161 and a host negative contact 163. The flex 160 can wrap around the outer housing 110 to create terminal pads on the outer housing 110.

The inner housing cover 134 can be a metal can, can be a metal coated plastic can, can be plastic, can have side walls and a lid built up from FR4, such as a thin layer of copper foil laminated to one or both sides, and/or can be any other cover. The base 136 can be an insulator with contacts, such as wire bond contacts on the interior side and surface-mount contacts on the exterior side. Components of microphone 100 can be designed to optimized acoustic properties such as acoustic resistance (R), inertance (L), and compliance (C), for filtering frequency response and/or noise. The base 136 can be PCB, such as FR4, can be plastic, can be a substrate, and/or can be any other base. Materials used for the inner housing cover 134, the base 136, the adapter housing 110, and/or other components can be used interchangeably, and/or for other elements.

Figure 5:
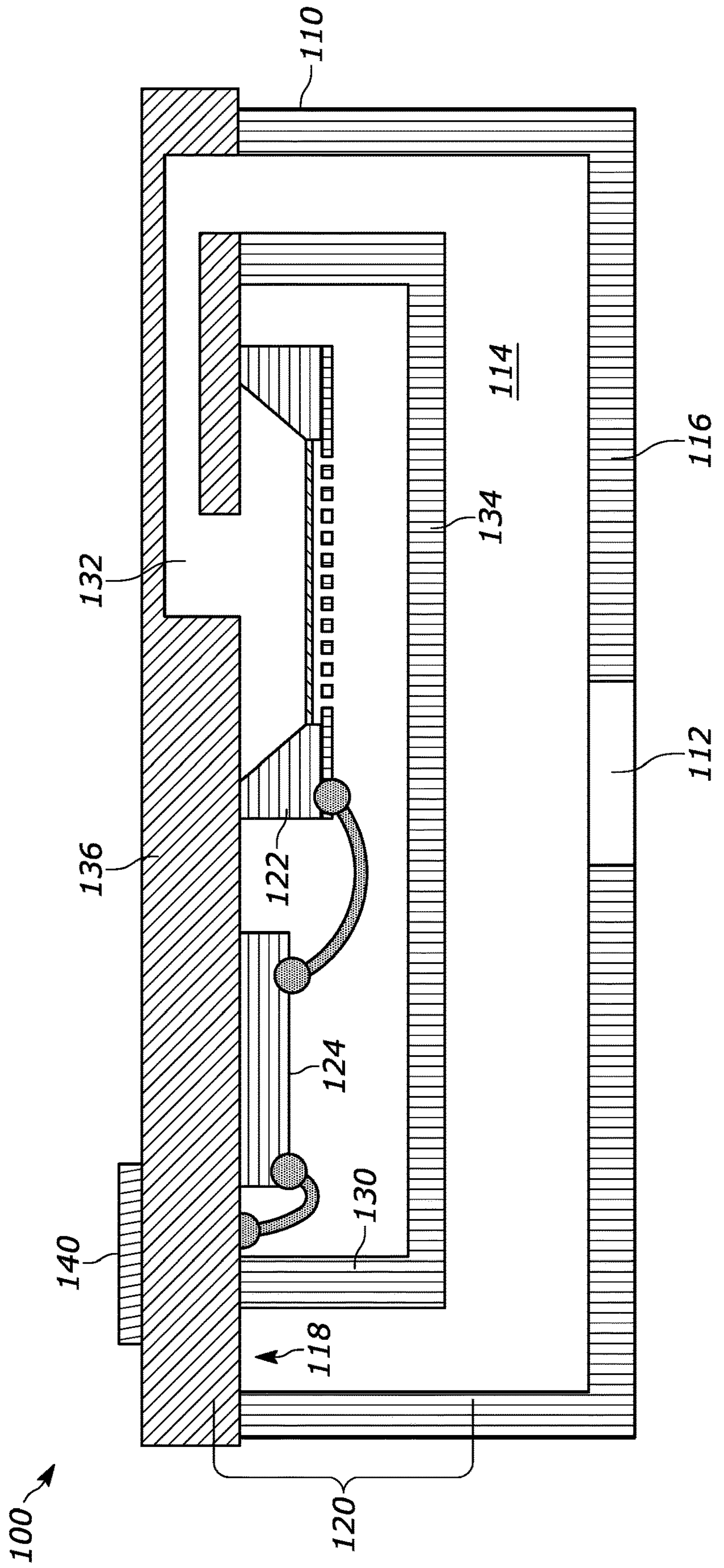
FIG. 5 is an example side cross-section view of a microphone according to a possible embodiment.
Figure 6:
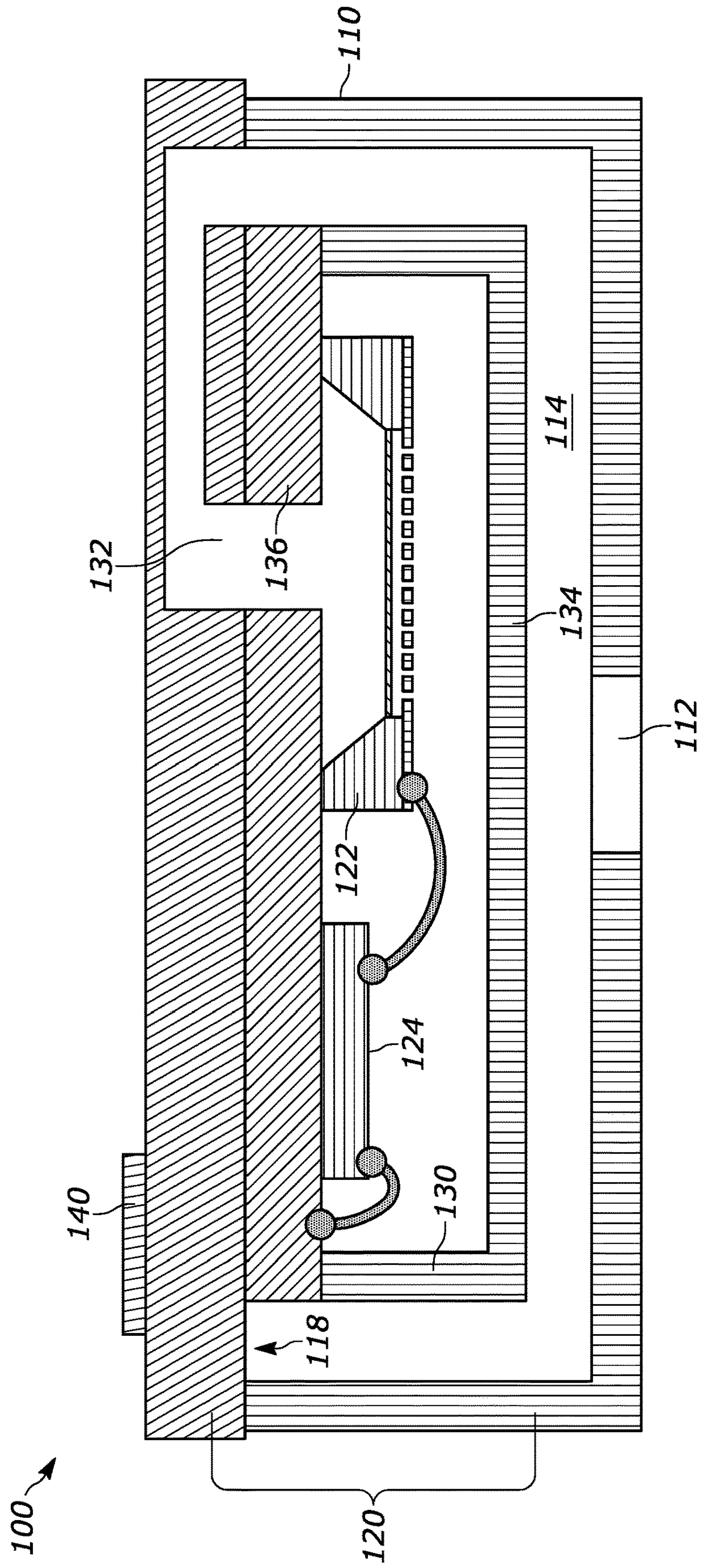
FIG. 6 is an example side cross-section view of a microphone according to a possible embodiment.

Referring to FIGS. 1, 5, and 6, the microphone 100 can include an acoustic channel 114 between the internal housing 130 and the adapter housing 110. The internal acoustic port 132 can be acoustically coupled to the outer acoustic port 112 by the acoustic channel 114. The acoustic channel 114 can be a tortuous path or other path or channel. The tortuous path can be an ingress barrier to light or particle contamination. The acoustic channel 114 can be configured to tune acoustic properties of the microphone. The acoustic properties include inertance (L), compliance (C), and/or resistance (R).

The acoustic channel 114 can have a defined length in the direction of air flow and a cross-sectional area perpendicular to air flow. The cross-sectional area can be defined by width and height, such as thickness, where the smaller dimension can be the height.

Acoustic compliance can be proportional to volume. Acoustic inertance can be proportional to length and inversely proportional to cross sectional area. Acoustic resistance can be proportional to length, inversely proportional to width, and, if sufficiently narrow, inversely proportional to the height to power of three, such as cubed.

Increased compliance can increase microphone sensitivity and can reduce resonant frequency. Increased inertance can reduce resonant frequency. Increased resistance can reduce resonant amplitude. Acoustic resistance (R), inertance (L), and compliance (C) can also be combined to resonating or filtering structures analogous to an R L C electrical resonator or an R C low pass filter.

The acoustic channel 114 can be and/or can be part of a resonator cavity. For example, the volume of the acoustic channel 114 itself can act as a resonator. According to another possible embodiment, at least one additional path or cavity can further act as a resonator in combination with the acoustic channel 114.

According to a possible embodiment, the microphone 100 can include at least one support member 170 separating at least a portion of the adapter housing 110 from at least a portion of the internal housing 130. The support member 170 can define at least a portion of the acoustic channel 114. A structure of the support member 170 can modify an acoustic property of sound propagating through the acoustic channel 114. For example, the support member 170 can made of ribs, fiber, woven material, gel, bumps, or other structures that can modify an acoustic property of sound propagating through the acoustic channel 114.

Referring to FIG. 1 according to a possible embodiment, the MEMS motor 122 can separate the internal housing 130 into a back volume 196 and a front volume 194 acoustically coupled to the internal acoustic port 132. Referring to FIG. 2 according to a possible embodiment, the internal housing 130 can include a back volume port 198 acoustically coupling the back volume 196 to a space 172 between the adapter housing 110 and the internal housing 130. The space 172 can be used as an enclosed volume and may not be open to the exterior of the adapter housing 110. According to another possible embodiment the space 172 can be open to an exterior of the adapter housing 110 via an external acoustic port, similar or dissimilar to the outer acoustic port 112. According to a possible embodiment, the flex circuit 160 of FIGS. 3 and 4 can be used as an interface between the contacts 140 and the electrical traces 212. Alternately, the host interface contacts 161-163 can be used as or instead of the electrical traces 212.

Referring to FIGS. 1 and 5, according to a possible embodiment, the internal housing 130 can include a cover 134 mounted on a base 136. The plurality of contacts 140 of the internal housing 130 can be surface-mount contacts disposed on the base 136. Referring to FIG. 5, the adapter housing 110 can include a cover 116 mounted to the base 136 of the internal housing 130. Thus, the internal housing 130 and adapter housing 110 can share the base 136 as a common base.

According to other possible embodiments, adapter housing 110 can include a metal can and plate or two metal cans. The adapter housing 110 can also have a PCB base with its own acoustic channel and outer can and can include a standard bottom port MEMS mounted to second PCB or flex. The adapter housing 110 can further have a PCB base with an acoustic channel and an outer can, such as two cans mounted on to one PCB. The adapter housing 110 can additionally have two PCB bases, where one can include an additional acoustic channel and the other can be located on the opposite side having the outer acoustic port 112. The adapter housing 110 can further have an over-molded external housing and acoustic channel.

According to a possible embodiment, the internal housing 130 can include the cover 134 mounted on the base 136. The internal acoustic port 132, the contacts 140, and the MEMS motor 122 can be disposed on the base 136.

According to a possible embodiment, the microphone 100 can include an acoustic channel 114 between the internal housing 130 and the adapter housing 110. The opening 118 can be disposed on a first side of the adapter housing 110 and the outer acoustic port 112 can be disposed on a second side of the adapter housing 110. The second side of the adapter housing 110 can be opposite the first side of the adapter housing 110. The internal acoustic port 132 can be acoustically coupled to the outer acoustic port 112 by the acoustic channel 114.

Referring to a possible embodiment of FIG. 7 the adapter housing can comprise a first cover 116 in the form of a stainless-steel cup and a second cover 119 in the form of a stainless-steel lid. The internal housing 130 can be a front cavity wall formed of molded plastic. The outer acoustic port 112 can be on a side of the first cover 116.

Referring to FIGS. 1 and 7, the microphone 100 can include an acoustic channel 114 between the internal housing 130 and the adapter housing 110. The opening 118 can be disposed on a first side of the adapter housing 110 and the outer acoustic port 112 can be disposed on a second side of the adapter housing 110, as shown in FIG. 7. The second side of the adapter housing 110 can be non-parallel to the first side of the adapter housing 110. For example, the opening 118 can be on the bottom of the adapter housing 110 and the adapter sound port 112 can be on the side of the adapter housing. The internal acoustic port 132 can be acoustically coupled to the outer acoustic port 112 by the acoustic channel 114.

Referring to a possible embodiment of FIG. 8, a shim 180 can be placed on bottom or top of the internal housing 130. The shim 180 can have a narrow channel, such as a slot 186, cut into material to constrict airflow and also the shim 180 may or may not act as a support structure. A flex 182 can also constrict airflow and serve same function. The flex 182 can have a slot 184 and the shim 180 can have another slot 186.

Referring back to FIG. 1, the microphone 100 can include the acoustic channel 114 between the internal housing 130 and the adapter housing 110. The internal acoustic port 132 can be acoustically coupled to the outer acoustic port 112 by the acoustic channel 114. The MEMS motor 122 can be a capacitive device comprising a diaphragm 192 separating the internal housing 130 into a front volume 194 having a height dimensions $h_1$ and a back volume 196 having a height dimension $h_2$ perpendicular to a surface of the diaphragm 192. The acoustic channel 114 can have a height dimension $h_3$, perpendicular to the surface of the diaphragm 192, where $h_3>h_1+h_2$.

The microphone is generally sensitive to vibration. Referring to FIG. 1, acceleration of the microphone 100 can cause displacement of air in the back volume 196 and air in the front volume 194. Such air displacement can displace the diaphragm 192 resulting in spurious signals, which may produce audible artifacts. The displacement is greatest when acceleration is in the direction perpendicular to the surface of diaphragm. Generally, the forces acting on the surface of the diaphragm are proportional to the height of the volume of air in front the volume $h_1$ and back volume $h_2$. Forces acting on surface area of the diaphragm 192 can also be quantified as pressure. The acceleration of the outer housing 110 can cause air in the acoustic channel 114 to exert force on the surface of the diaphragm 192. Furthermore, when acceleration is in the direction perpendicular to the surface of diaphragm 192, the force acting on the surface of diaphragm 192 can be proportional to the height of the volume of air in channel $h_3$.

Referring to FIGS. 1, 5, 6, 7, and 8, the outer acoustic port 112 can be disposed facing a direction opposite to internal acoustic port 132 with acoustic channel 114 between the outer acoustic port 112 and the internal acoustic port 132. For this orientation of the internal acoustic port 132 and the outer acoustic port 112, the direction of the force acting on diaphragm 192 can be opposite to the direction of the forces produced by the air in the front volume 194, and air in the back volume 196 and can reduce vibration sensitivity. A reduction of vibration sensitivity by more than 3 dB can be considered useful. Cancellation of vibration in a direction perpendicular to the diaphragm surface can be based on h3=h1+h2+(diaphragm_mass/(diaphragm_area*air_density)).

According to a possible embodiment, the opening 118 can be disposed on a first side of the adapter housing 110 and the outer acoustic port 112 can be disposed on a second side of the adapter housing 110. The second side of the adapter housing 110 can be opposite the first side of the adapter housing 110. The height dimension $h_3$ can extend between the first and second sides of the adapter housing 110.

Generally, adapters, such as the adapter housing 110, of various embodiments can provide backward compatibility for microphones of any technology (e.g., MEMS, electret, piezo, etc.) having a smaller size or different form-factor than legacy microphones. For example, such an adapter can permit use of a MEMS microphone as a drop-in replacement in applications or sockets for which legacy electret microphones are used. At least some embodiments can also provide for ingress protection, from particles and light, and/or flexibility in tuning frequency response and/or noise.

For example, embodiments can provide for an internal cavity created by an inner and an outer housing. The internal cavity can provide an acoustic path for frequency response shaping. Embodiments can also provide for an internal cavity created by an inner and an outer housing as additional back volume for a microphone. Embodiments can further provide for an internal acoustic path with air mass to cancel or reduce vibration response. Embodiments can additionally provide for an internal tortuous path for ingress protection with separation of internal and external acoustic ports. Embodiments can also provide for double housing using an inner and an outer housing to provide barrier to light penetration.

Embodiments can provide a microphone assembly including an inner MEMS microphone enclosed in outer housing, which can be a metal can or cup and a PCB or flex for terminal pads. The internal microphone can be a MEMS microphone, an electret microphone, or other microphone. The MEMS microphone can be a bottom port or a top port MEMS microphone. The MEMS microphone can have electronic trimmable filters, can have various sizes to tune resonant frequencies, and may or may not be vented into an enclosed volume in an external housing to increase back volume of MEMS microphone for improved performance. The MEMS microphone can be fully packaged as a PCB and a can or a MEMS and an ASIC die mounted on support structure within external housing. External terminals can be on a flex, on a PCB, or can be other external terminals. The external housing can include a metal can or cup, a cover, such as a cup or plate, and terminal pads. It can also have various sizes. The external housing can be rectangular, cylindrical, or any other shape. External terminals and external port configuration can be modified for requirements of hearing aid design, requirements of smartphone design, requirements of laptop computer design, or requirements of other designs for other devices.

According to at least some embodiments, an internal acoustic channel, such as a cavity, can be located between the inner and the outer housing. The channel can be created utilizing spacer shim(s), protrusion(s) on a cup, or other structures for acoustic response shaping and can also provide mechanical support or mechanical isolation for an inner microphone. The internal acoustic channel can be designed to tune resonant frequencies and amplitudes of the microphone and can include additional components or material, such as rubber inserts, woven material, fiber, gel, and/or other components or material to modify air flow. The channel can also include porous acoustic material, such as mesh or foam, compliant material, gel, and/or other material in the channel. The internal acoustic channel can additionally include a path or cavity as a resonator. The resonator can be within space between inner or outer housing or incorporated within flex/PCB for terminals. The internal housing can contain a controlled acoustic leak, such as ports or holes, to utilize space between the inner and the outer housing as additional back volume. Acoustical properties of the channel can include any combination of acoustic resistance, inertance and compliance to create damping or resonating structures or other properties.

Additional aspects of a MEMS microphone can be utilized to tune acoustical properties of path including a perforated or notched perimeter on MEMS PCB; a size of an MEMS acoustic port, which can affect higher order resonances; and/or an internal microphone port that can be aligned toward or away from external acoustic port to alter length of acoustic channel or to enable the area between inner and outer housing to act as additional back volume.

Embodiments can further minimize vibration. For example, the internal channel created by inner and outer housing with an air mass can balance, such as cancel or reduce, motion of air in the microphone inner housing, including front and back volume, and motion of the diaphragm. The design can be adjusted to include any channels external to the microphone in a housing, such as a hearing aid housing. Vibration can also be minimized using soft mounting and supporting material for the internal microphone for mechanical isolation.

Embodiments can further provide ingress protection. For example, an internal acoustic channel can separate the external acoustic port and the internal acoustic port for protection against foreign material, such as by using a tortuous path for ingress protection from materials that can be solid, liquid, or vapor. Also, a membrane or mesh, such as a screen, can be inserted into the channel to provide a barrier for ingress protection.

Embodiments can additionally provide for a support structure between the inner and outer housings. The support structure can be a protrusion on cup such as a bump or semi perforation, a component such as a spacer or shim, soft material such as rubber or silicone, or other support structures. The support structure can be a hard material like metal or a soft material, such as rubber or gel. The support structure can function as support only, can function as shock protection, can function as acoustic response shaping, and/or can provide other functions.

At least some methods of this disclosure can be implemented on a programmed processor. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as “first,” “second,” and the like may be used solely to distinguish one entity or action from another entity or action without necessarily requiring or implying any actual such relationship or order between such entities or actions. The phrase “at least one of,” “at least one selected from the group of,” or “at least one selected from” followed by a list is defined to mean one, some, or all, but not necessarily all of, the elements in the list. The terms “comprises,” “comprising,” “including,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “a,” “an,” or the like does not, without more constraints, preclude the existence of additional identical elements in the process, method, article, or apparatus that comprises the element. Also, the term “another” is defined as at least a second or more. The terms “including,” “having,” and the like, as used herein, are defined as “comprising.” Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. A microphone assembly comprising:

a form-factor adapter housing including an interface opening and an outer acoustic port;

an internal microphone assembly disposed at least partially within the form-factor adapter housing, the internal microphone assembly including:

an internal housing having:

a base;

an internal housing cover mounted on the base; and an internal acoustic port;

a microelectromechanical systems (MEMS) motor disposed in the internal housing;

an integrated circuit disposed in the internal housing, the integrated circuit electrically coupled to the MEMS motor; and a plurality of electrical interface contacts disposed on the base, the plurality of electrical interface contacts electrically coupled to the integrated circuit; and an adapter interface located at the interface opening and comprising a plurality of external host device interface contacts electrically coupled to the plurality of electrical interface contacts, the plurality of external host device interface contacts exposed to an exterior of the microphone assembly, wherein the MEMS motor is acoustically coupled to the outer acoustic port via a sound path between the form-factor adapter housing, the internal housing, and the internal acoustic port.

2. The microphone assembly according to claim 1, wherein the form-factor adapter housing comprises an adapter housing cover covering a portion of the internal housing, a gap between the adapter housing cover and the portion of the internal housing providing at least a portion of the sound path.

3. The microphone assembly according to claim 1, wherein the adapter interface comprises a printed circuit board (PCB), where the plurality of external host device interface contacts are located on the PCB.

4. The microphone assembly according to claim 1, wherein the adapter interface changes an order of electrical connections of the plurality of electrical interface contacts as they appear on the host device interface contacts.

5. The microphone assembly according to claim 4,
wherein the plurality of electrical interface contacts comprise three internal electrical interface contacts arranged in an internal contact row, where an electrical interface contact on an outside contact of the internal contact row comprises an internal data electrical interface contact, and
the plurality of the host device interface contacts comprise three host device interface contacts arranged in a host contact row, where a host device interface contact in a middle of the host contact row comprises a host device data interface contact, the host device data interface contact electrically coupled to the internal data electrical interface contact.

6. The microphone assembly according to claim 1,
the base including:
a first base side facing an interior of the internal housing; and
a second base side opposite the first base side,
the plurality of electrical interface contacts disposed on the second base side, the plurality of electrical contacts electrically coupled to the integrated circuit via electrical traces.

7. The microphone assembly according to claim 6,
the MEMS motor is disposed in the internal housing on the first base side, and
the integrated circuit is disposed in the internal housing on the first base side.

8. The microphone assembly according to claim 6,
the internal acoustic port is through the base from the first base side to the second base side.

9. A microphone assembly comprising:
a form-factor adapter housing including an interface opening and an external acoustic port;
an internal microphone assembly disposed at least partially within the form-factor adapter housing, the internal microphone assembly comprising:
an internal housing having an internal acoustic port and a plurality of electrical interface contacts;
a microelectromechanical systems (MEMS) motor disposed in the internal housing; and
an integrated circuit disposed in the internal housing, the integrated circuit electrically coupled to the MEMS motor and to the plurality of electrical interface contacts; and
an adapter interface located at the interface opening and comprising a plurality of external host device interface contacts electrically coupled to the plurality of electrical interface contacts, the plurality of external host device interface contacts exposed to an exterior of the microphone assembly,
wherein the internal acoustic port is acoustically coupled to the external acoustic port.

10. The microphone assembly according to claim 9,
the form-factor adapter housing comprising a form-factor adapter housing cover adjacent to the interface opening,
the internal housing comprising a base comprising the internal acoustic port and the plurality of electrical interface contacts, at least a portion of the base adjacent to, and spaced apart from, the form-factor adapter housing cover,
wherein the internal acoustic port is acoustically coupled to the external acoustic port via a sound path between the base and the form-factor adapter housing cover.

11. The microphone assembly according to claim 10,
the MEMS motor coupled to the base and located over the internal acoustic port, and
the internal housing comprising a cover fastened to the base.

12. The microphone assembly according to claim 11, the plurality of electrical interface contacts of the internal housing located at the interface opening of the form-factor adapter housing.

13. The microphone assembly according to claim 11, the external acoustic port located on a portion of the form-factor adapter housing other than the form-factor adapter housing cover, wherein the internal acoustic port is acoustically coupled to the external acoustic port via a sound path between the form-factor adapter housing and the internal housing.

14. The microphone assembly according to claim 9,
the form-factor adapter housing comprising a form-factor adapter housing cover adjacent to the interface opening,
the internal housing comprising an internal housing cover fastened to a base comprising the internal acoustic port and the plurality of electrical interface contacts, at least a portion of the internal housing cover adjacent to the form-factor adapter housing cover,
the adapter interface comprising a flex printed circuit board (PCB) extending partially about the internal housing between the base and the interface opening.

15. The microphone assembly according to claim 14, the MEMS motor coupled to the base and located over the internal acoustic port.

16. The microphone assembly according to claim 15, the external acoustic port located on a portion of the form-factor adapter housing other than the form-factor adapter housing cover, wherein the internal acoustic port is acoustically coupled to the external acoustic port via a sound path.

17. The microphone assembly according to claim 9, the adapter interface comprising a printed circuit board (PCB), wherein the plurality of external host device interface contacts are located on the PCB.

18. The microphone assembly according to claim 9, wherein an order of arrangement of the plurality of electrical interface contacts is different than an order of arrangement of the external host device interface contacts.

19. The microphone assembly according to claim 9, the plurality of electrical interface contacts comprise ground (GRND), power (PWR) and DATA contacts electrically connected to corresponding GRND, PWR and DATA contacts of the plurality of external host device interface contacts, wherein an order of arrangement of the plurality of electrical interface contacts is different than an order of arrangement of the plurality of external host device interface contacts.

* * * * *